April 27, 1954 D. G. C. LUCK 2,677,119

GROUND CONTROLLED AIRCRAFT COMMUNICATION SYSTEM

Filed July 24, 1950 7 Sheets-Sheet 1

INVENTOR
David G. C. Luck
BY Charles H. Brown
ATTORNEY

INVENTOR
David G. C. Luck
BY Charles H. Brown
ATTORNEY

INVENTOR
David G. C. Luck
BY Charles H. Brown
ATTORNEY

April 27, 1954 D. G. C. LUCK 2,677,119

GROUND CONTROLLED AIRCRAFT COMMUNICATION SYSTEM

Filed July 24, 1950

7 Sheets-Sheet 4

INVENTOR
David G. C. Luck
BY Charles H. Brown
ATTORNEY

Code:

| IN | - | a | b | c | d | e | ab | ac | ad | ae | bc | bd | be | cd | ce | de | abcd | abce | abde |
|---|---|---|---|---|---|---|---|---|---|---|---|---|---|---|---|---|---|---|---|
| OUT I | 6 | 6 | 6 | 6 | 6 | 6 | 1 | 2 | 3 | 4 | 2 | 3 | 4 | 3 | 4 | 4 | 3 | 4 | 4 |
| OUT II | 6 | 6 | 6 | 6 | 6 | 6 | 1 | 1 | 1 | 1 | 2 | 2 | 2 | 3 | 3 | 4 | 1 | 1 | 1 |

| IN | abc | abd | abe | acd | ace | ade | bcd | bce | bde | cde | abcde | acde | bcde |
|---|---|---|---|---|---|---|---|---|---|---|---|---|---|
| OUT I | 6 | 6 | 6 | 6 | 6 | 6 | 6 | 6 | 6 | 6 | 6 | 4 | 4 |
| OUT II | 6 | 6 | 6 | 6 | 6 | 6 | 6 | 6 | 6 | 6 | 6 | 1 | 2 |

INVENTOR
David G. C. Luck
BY Charles H. Brown
ATTORNEY

GROUND CONTROLLED AIRCRAFT COMMUNICATION SYSTEM

Filed July 24, 1950 7 Sheets-Sheet 6

INVENTOR
David G. C. Luck
BY Charles H. Brown
ATTORNEY

GROUND CONTROLLED AIRCRAFT COMMUNICATION SYSTEM

Filed July 24, 1950 7 Sheets-Sheet 7

INVENTOR
David G.C.Luck
BY Charles H. Brown
ATTORNEY

Patented Apr. 27, 1954

2,677,119

UNITED STATES PATENT OFFICE 2,677,119

GROUND CONTROLLED AIRCRAFT COMMUNICATION SYSTEM

David George Croft Luck, Princeton, N. J., assignor to Radio Corporation of America, a corporation of Delaware Application July 24, 1950, Serial No. 175,596

13 Claims. (Cl. 340—23)

The invention relates to communication between aircraft and ground and it particularly pertains to such communication established for the control of aircraft in flight by control stations located on the ground.

In the control of dense air traffic, it is necessary for the ground control centers to transmit many routine orders to and receive many routine reports from a very large number of aircraft individually and selectively without creating interference or using an excessive part of the radio frequency spectrum. As in all aviation operations, restrictions on weight, volume, and complexity of operating procedure are very stringent for the airborne portions of the equipment.

One proposed service, termed the "private line" radio system, is to provide visual display of rather specifically selected information in that individual aircraft to which each item is pertinent, and, on the ground, to display information from each aircraft in a way suited to automatic use of this information by control aids on the ground. Typical clearances specifying air route and lane assignment (4 decimal digits), altitude in hundreds of feet (300 values), time to nearest minute (1440 values), assigned destination (3 letters), etc., and must be able to confirm reports from aircraft. Aircraft must be able to confirm ground transmissions, and must also report new data. These requirements serve as a general guide in determining the equipment and methods required. The number of aircraft to be handled at any one time is expected to reach as high as 500.

Several related factors determine the organization of such a private-line system. These concern the methods of multiplexing used to provide interference-free operation with large numbers of aircraft and a network of ground stations, the method to be used in coding and decoding the information transmitted, and the method for routing each piece of information exclusively to the correct recipient. Limitations are imposed by the fact that, if the code elements of the transmitted signals are too brief, radio transmission is easily garbled by multipath effects, while if they are too long, the rate of communication with hundreds of aircraft becomes intolerably slow.

Routing or addressing each item of information to insure that it reaches the correct destination and does not appear at any undesired destination is very important. Addressing a definite position in space is possible in principle, but practical proposals for accomplishing this have not to date been fully satisfactory. Addressing might also be accomplished by entering each item in the proper time "slot" of a synchronous time-division multiplex system. This calls for arbitrary channel assignments before communication can begin, and for very precise and reliable synchronization.

According to the system of the invention, all aircraft are addressed on an airframe identity basis, using the full identity as a single code "character." Each aircraft need only recognize one identity character, its own, so the complexity of this code need not give rise to an unduly complex airborne decoder. Proper methods of establishing communication with aircraft entering the system will avoid unduly complex identity decoding on the ground. Small subgroups within the identity code-element group serve adequately for data coding. Code transmission by assigning a sub-carrier frequency to each element of the group saves time by transmitting each character as a single multitone pulse, the character being identified by the tones present in the pulse, and facilitates distribution of the code elements to physically separate channels for decoding. Multiplexing of transmissions to many aircraft is accomplished through time sharing by simple sequential transmission, after the fashion of a roll call, with no requirement for refined synchronization. "Multiplexing" of ground stations is accomplished on a carrier frequency basis, by judicious assignment of a moderate number of channels according to a geographical plan. This has the great advantage of needing no synchronization at all between ground stations.

Because of its importance to safety of life, the chance of error in operation of the private-line equipment must be made extremely small. One type of safety code requires that every character have the same predetermined number of "mark" elements so that an even number of elements (at least two) must be falsified to produce an unrecognized error. Such codes are not maximally efficient, but are quite practicable. A closed-circuit check requires that all information received be retransmitted to the point of origin, for comparison with the original, to warn of error. Since ground-to-air transmissions are to inform a human agent, a complete closed-circuit check must include reading and manual reproduction by him of received information. Because of the confusion resulting from false address, and of the importance of the safety signals (proceed, hold, etc.), a safety code should probably be used for identity and safety portions of the transmission.

A typical operating sequence may be as follows: ground transmits identity character (1-millisecond multitone pulse) which "unlocks" only one aircraft installation; ground then transmits a (1-millisecond) message character and, after delay required for radio-wave travel, the unlocked aircraft installation transmits own identity character; the aircraft transmits a message character; ground compares identity of aircraft with that called to check correct delivery of message. After a guard pause, ground transmits identity of another aircraft on its roster, and the above sequence is repeated for the new aircraft. This is done successively for each aircraft on the roster. If the sequence for each aircraft occupies 4 milliseconds, individual two-way contact with each one of a roster of 500 aircraft can be had every two seconds. If the sub-carrier tones representing code elements are in the neighborhood of 1 megacycle, a 1-millisecond pulse will contain about 1000 oscillations and so will be ample for selective recognition of each component tone.

Normally, each aircraft involved will have filed a flight plan, which will be on record at each ground control point concerned in the intended flight. On the basis of flight plans on file, the identity call of an aircraft can be added to the roll being handled by each ground station shortly before communication between that station and that aircraft is likely to be needed. If necessary in special cases, an initial or revised flight plan may be filed by common-channel radiophone while in flight.

The total number of airframes that will exist in the world, one or two decades hence, and the proportion of these that will require assignment of private-line identity on a world-wide rather than a regional basis, can not be accurately predicted today. If, however, a code group of 24 elements is chosen, and to give a safety code it is required that any 14 of these elements be present and the other 10 be absent to form an identity "character," then 1,961,256 distinct characters will be available and each can be assigned to an airframe. A second identity group using 16 "mark" and 8 "space" elements will add another 735,471 characters if required. Bearing in mind that most aircraft will usually operate within a limited region, permitting their permanent radio identification to be safely duplicated in remote regions, and that a block of world-wide identities may be held in reserve for temporary use by such aircraft during their unusual operation in other than their home regions, this identity code is capable of serving a very large world population of aircraft.

For flexibility and for simplicity in decoding, it is desirable to divide the overall message character into sub-characters, by dividing the 24-element code group into several subgroups. Thus, 5 elements of the 24 may be assigned to safety signals, and if a safety code of 2 mark and 3 space elements be used in this group, 10 distinct signals (proceed, hold, emergency, etc.) can be given. Seven additional elements may be assigned as a general-purpose subgroup, with one or two elements marking, to give a choice of 28 service messages. This leaves 12 elements for transmission and identification of quantitative data, with considerable latitude of choice as to their employment.

Using all combinations of 8 or less of 12 elements as marking, 3796 distinct data characters could be formed. These would not be subject to any convenient classification, so the decoder would be complex and the code an inconvenient one. By dividing these 12 elements into subgroups of three, with one or two elements marking in each group of three, however, four six-valued data characters can be transmitted at once. This gives only 1296 (or $6^4$) total data characters rather than 3796, but leads to very simple decoding, and, because it leads naturally to subclassification of data, is very convenient and flexible in application. It may be noted that the six message-code subgroups of 5, 7, 3, 3, 3 and 3 elements, with a maximum of 12 elements marking at a time, fully utilize the 24-element main group but never duplicate any of the identity code characters, which require that 14 (or 16) elements shall be marking at once.

The data may be displayed, for example, as characters appearing on the rims of rotatable drums, viewed through small windows in an indicator panel, after the fashion of a glorified Veeder counter. The coding suggested above would permit a single transmission to select any one of 36 drums and set it to any one of 36 positions. The characters displayed may be letters, numerals or arbitrary ideograms of any sort. It would be desirable to set up a complete piece of information on each transmission but as it takes a second or two to select and set each drum and since each aircraft is contacted once every second or two, there is little actual loss of time or increase of confusion as a result of transmitting one ideogram at a time.

A typical ground-to-air transmitted message, following its identity address, might be:

| | |
|---|---|
| " General purpose | Safety signal |
| (You are cleared to) | (Proceed at) |
| Data class | Data " |
| (Altitude thousands of feet | (19 ) |

Normally, all of these four components will be present in each message. Ground may transmit clearance or may acknowledge data received from aircraft; aircraft may request clearances, report data, or acknowledge data received from ground. The 28-valued, 7-element, general-purpose code subgroup will identify the exact nature of each message transmitted. Normally, completion of a piece of information already partially sent will take precedence over any other transmission, and thereafter acknowledgment of data received will be made before fresh information is transmitted. The method of selective transmission and reception of a predetermined set of messages which does constitute this invention is most easily understood when simple manual methods of acknowledgment and of establishing precedence are used, and will be described in terms of such methods.

It has been mentioned that a complete message can be sent in 1 millisecond by using a multitone code pulse, and that to set such a message up on a selected indicator drum will take a second or so. Obviously, some sort of intermediate data storage is necessary. Transmission of only a limited amount of information in each message, and classification of this message information into code subgroups has the advantage of permitting the use of a relatively simple storage mechanism, one form of which will be described. Transfer of received information from intermediate storage to a remote set of indicator drums may be accomplished in various ways; a relatively simple method using an intermediate code will be described. The storage element serves in this case as a code translator also. Elements of the intermediate code group are represented by wires in connecting cables, and to save cabling a code having few many-valued elements rather than many two-valued elements (mark-space), elements is chosen. The same intermediate code can also be used to save cabling from the remote manual transmitting panel to the main private-line equipment.

It is an object of the invention to provide a system for communicating between an individual one of any number of aircraft in flight and a ground station controlling the flight of those aircraft whereby a complete flight order may be transmitted and verified in a short period of time enabling rapid and accurate control of that aircraft and in addition enabling many other aircraft to be so controlled without endangering any of the aircraft or distracting personnel in other aircraft.

It is another object of the invention to provide a flight control communication system substantially free from error in transmission and reception of intelligence constituting flight data and orders.

It is a further object of the invention to provide a communication system for aircraft flight control having extreme flexibility in assignment of intelligence to enable a large number of fixed characters to be transmitted with a minimum number of code groups.

It is still another object of the invention to provide transducer apparatus for an aircraft flight control communication system to display pertinent data in ready useable form and further provide means for readily changing such data display.

It is a still further object of the invention to provide circuitry for interconnecting and controlling the operation of known radio communications components to provide communication according to the preceding objects.

It is yet another object of the invention to provide a system according to the preceding objects which incorporates safety provisions.

It is yet a further object of the invention to provide a communications system in accordance with the preceding objects which incorporates circuit means automatically checking the operation of the system.

The foregoing and other objects of the invention which will appear as the specification progresses are achieved in a ground-to-aircraft communications system comprising ground and aircraft receiver and transmitter installations having coding and decoding means manually and automatically actuated to operate the transmitters and receivers to establish contact by the ground station with a single sole airframe of any number of aircraft in flight, to verify that contact and thereafter to exchange flight control data. Identification of the airframe and establishment of communication is preferably made by a unique group of simultaneously opposing tones and data is subsequently communicated by other tone groups having a predetermined number of elements of given nature for each class of information exchanged.

The invention will be described in detail with reference to an express embodiment illustrated in the accompanying drawing forming a part of the specification and in which.

Figure 1:
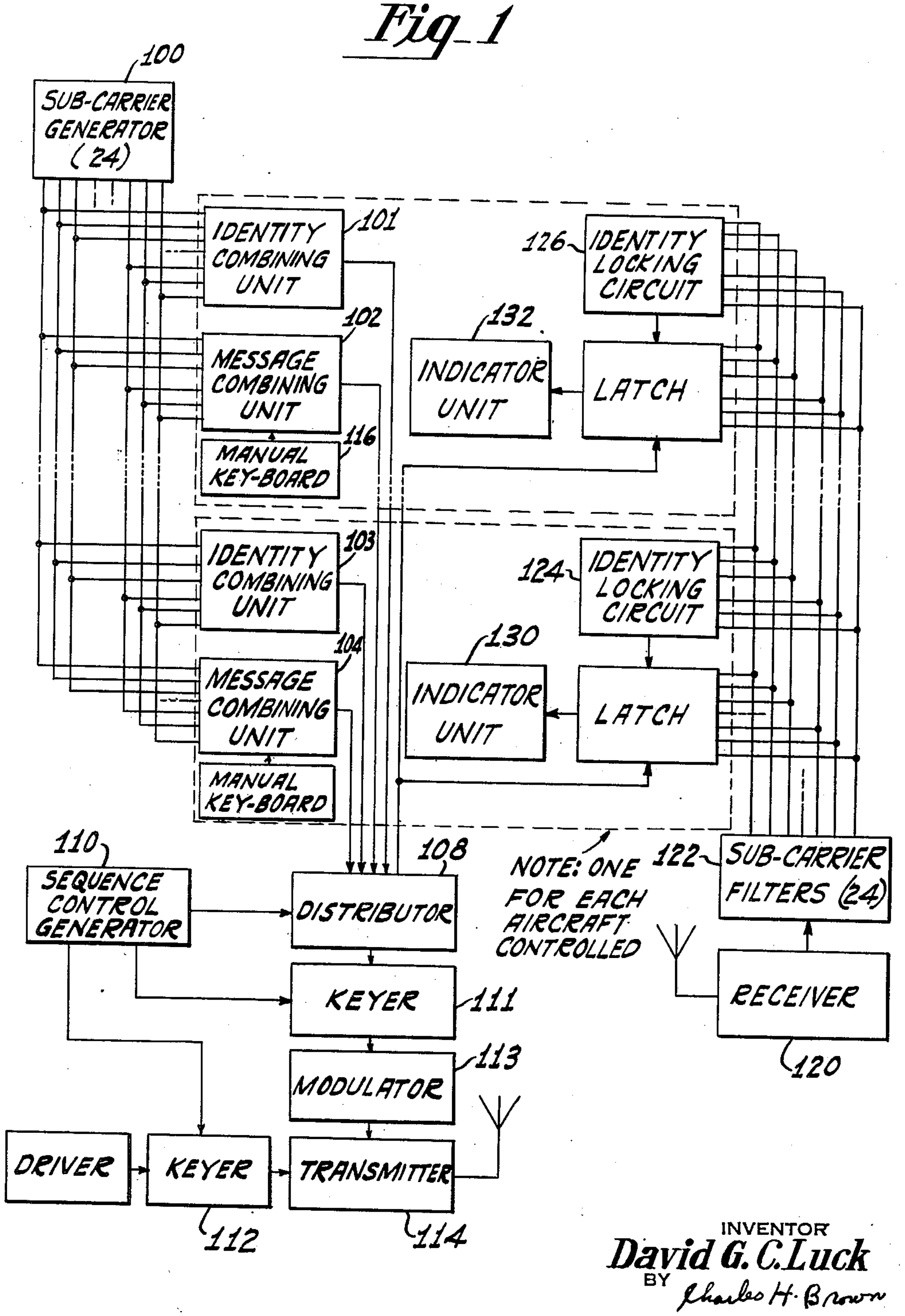
Fig. 1 is a functional diagram of an example of ground installation according to the invention.

Referring to Fig. 1, there is shown a block diagram of a ground installation according to the invention, including a subcarrier generator 100 from which a plurality of output tones, preferably 24 in number, are applied to identity and message combining units 101, 102, and so on; there being one such unit for each aircraft to be controlled by the ground station. A distributor 108 under the control of a sequence control generator 110 successively selects the identity and message combining units 101, 102, and so on to transmit a train of identity signals which in effect repeatedly "calls the roll" of the aircraft under control by subsequent action of keyers 111, 112, modulator 113 and amplifier 114. Provisions are also made to utilize the output of manual sending units 116, 118, and so on for setting up message data to be transmitted from message combining units 102, 104 and so on. Such data may be obtained alternately from flight control computing apparatus and the like, if such practice is deemed necessary or desirable. Signals transmitted by airborne installations are received by a receiver 120 and applied by way of a group 122 of subcarrier filter networks through identity code locks 124, 126, and so on; there being one such lock preset for each aircraft on the roll; and thence presented on individual indicators 130, 132 and so on. Receiving operations are of course synchronized with the transmitting process through control of the sequence control generator 110. As the specification progresses with the description of the airborne installation, the arrangement of Fig. 1 will be duly detailed since the two equipments are basically the same.

Figures 2, 3:
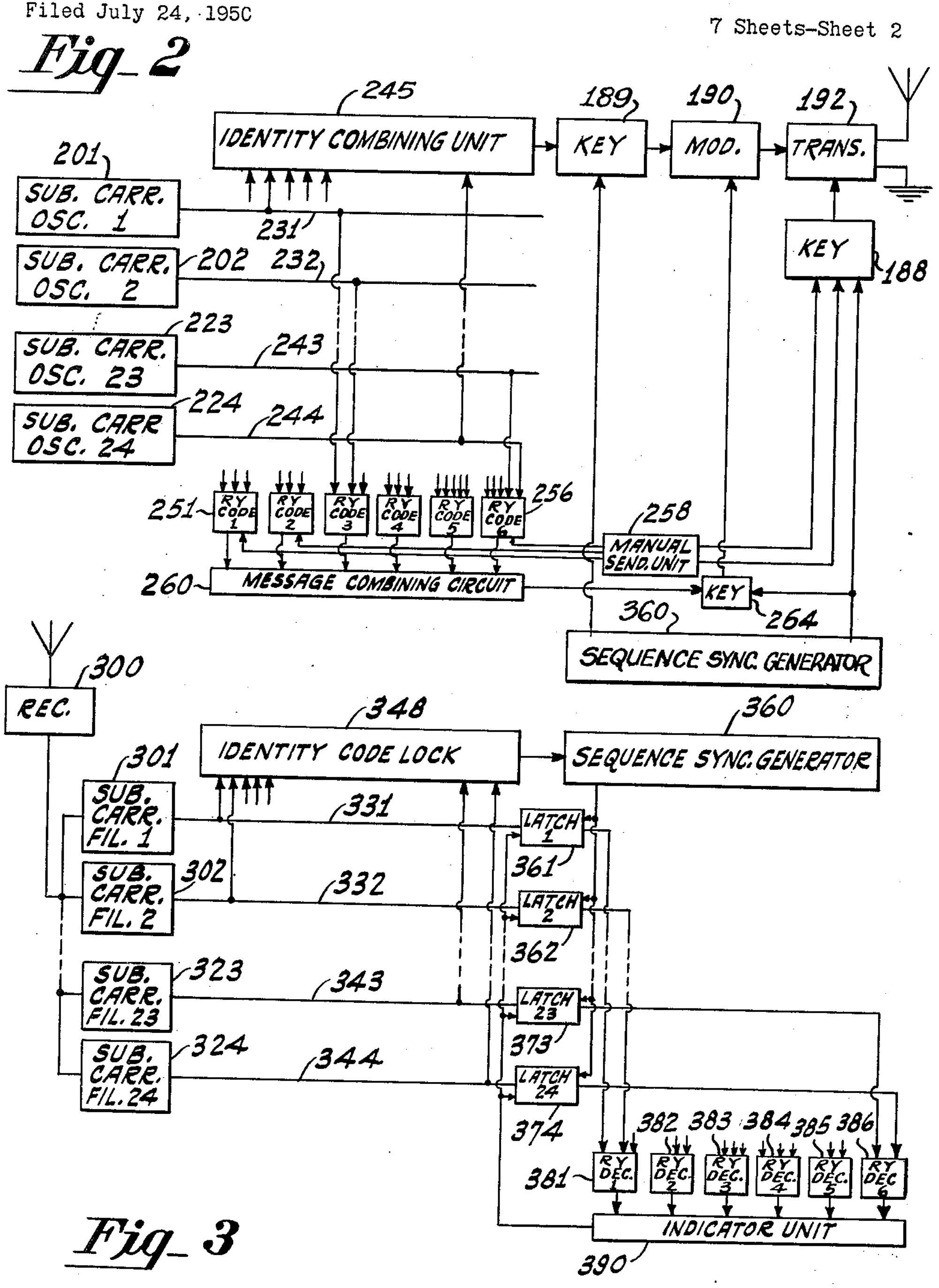
Figs. 2 and 3 are functional diagrams of co-operating airborne transmitter and receiver, respectively, according to the invention.

Referring to Fig. 2, there is shown a block diagram of an airborne private-line transmitter according to the invention, which transmitter is basically the same as the ground transmitter, but has only a message and identity originating unit for the airframe in which it is installed. Airborne transmissions are sequenced, in response to reception from the ground, by a simple triggered sequence controller or synchronizing generator 360 which is preferably located in the airborne receiver, later to be described more fully. The radio modulator 190 and its transmitter 192 themselves are intended to be entirely conventional for the radio-frequency channel and type of modulation chosen, so need not be described further.

A bank of 24 sub-carrier generators 201—224 (only four being shown for clarity) energizes corresponding sub-carrier buses 231—244. These generators may, for example, operate at frequencies that are all integral multiples of 10 kilocycles per second, from 890 to 1120 kc./s. inclusive. For stability and simplicity, they may be ordinary, rough crystal-controlled oscillators, or harmonic generators. Signals from 14 sub-carrier buses are selected by making the proper connections when the equipment is installed, it being contemplated that the coded connecting plug will remain with the airframe to insure the original selection when changing transmitters, and are fed to a combining circuit 245 which has a single multiple-tone output representing airframe identity. Sub-carriers selected according to the message-code subgroups and the message to be transmitted are picked from the buses by a set of relay coders 251—256, controlled by a conveniently located manual sending unit 258, and are fed to another combining circuit 260 with a single multitone output containing message information. Identity or message code is keyed into the modulator by 1-millisecond sequencing impulses from the receiver; these impulses also key the transmitter itself if a transmit key of the manual sender is depressed, and initiate a sender-clearing signal when transmission occurs. Combining circuits may be of the simple resistor and feedback amplifier type shown in Fig. 4, in which the feedback connection greatly reduces crosstalk between buses caused by the combining connections.

Figures 4, 5:
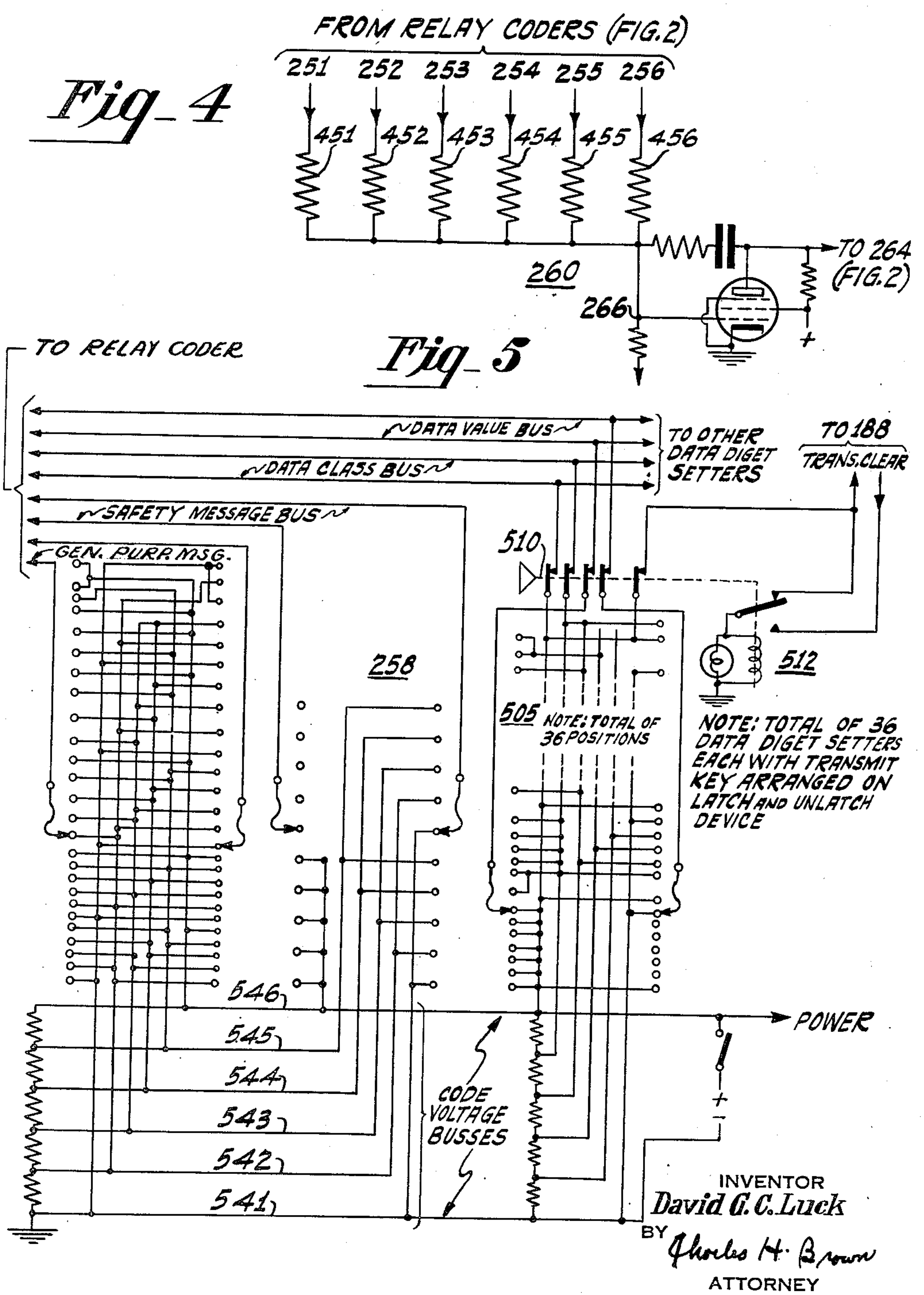
Fig. 4 is a schematic diagram of electronic combining circuitry performing a function according to the invention.
Fig. 5 is a schematic diagram of a portion of a manual sending unit according to the invention.

Fig. 5 shows a practical arrangement of the manual sending unit 258, with switches arranged to connect each one of seven cable leads to any one of six coding voltages and arranged to energize an eighth lead, if desired, according to the message information set in by hand. The switches selecting the text of the general-purpose and safety messages may be associated mechanically with drums displaying the selected text, if desired. Data values selected by up to 36 switches having up to 36 positions, are possible with the particular arrangement shown, and a push-button switch 510 associated with each of data value setters 505 can serve to determine the class of data to be sent in any given transmission and to initiate transmission. The key depressed can be latched down by a lock-in magnetic mechanism 512, and cleared upon transmission by breaking the lock-in circuit. In this manner, only one switch at a time can be latched down.

Figures 6, 7, 8:
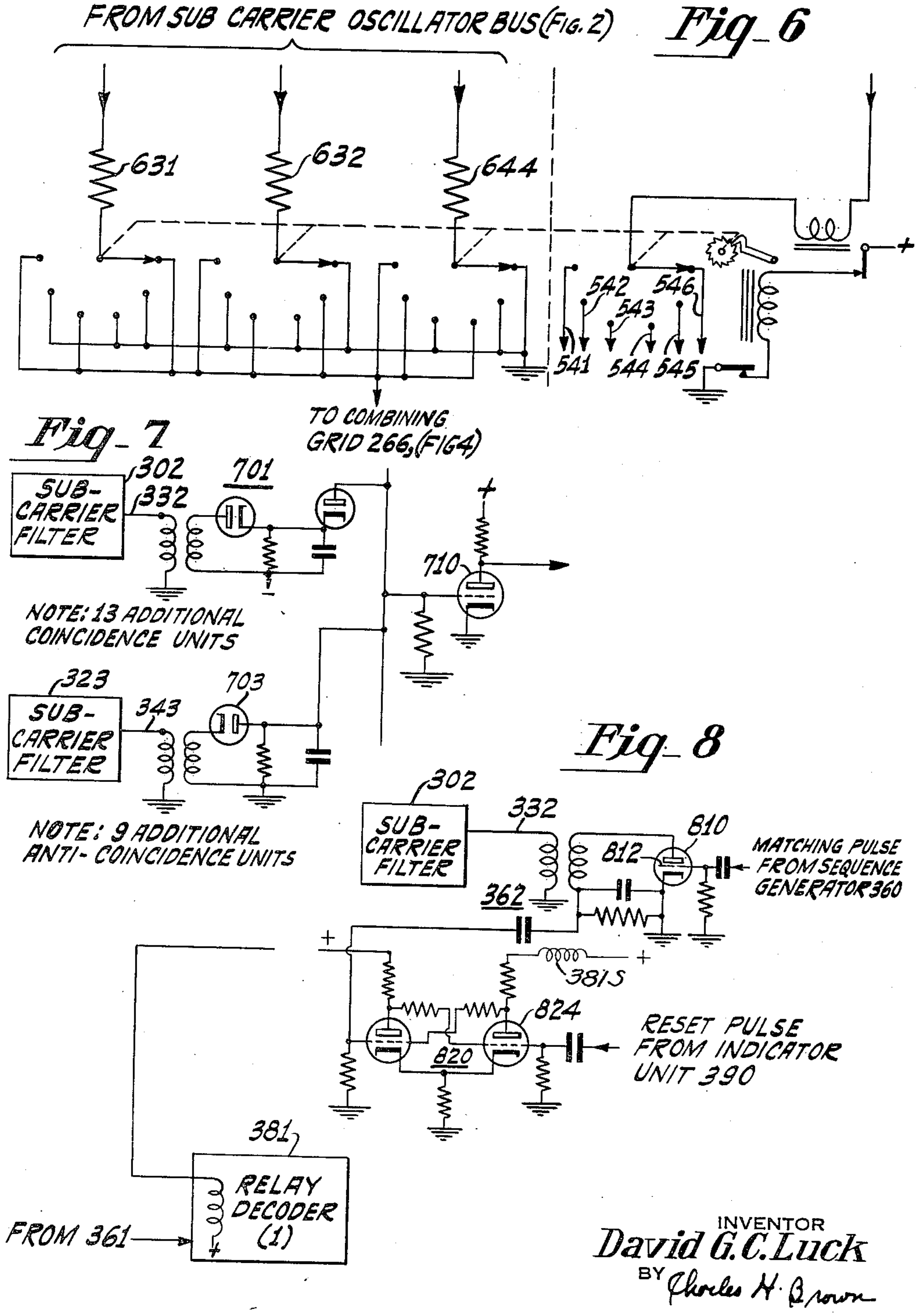
Fig. 6 is a schematic diagram of the basic circuitry of a relay coding unit according to the invention.
Fig. 7 is a schematic diagram illustrating the basic circuitry of an identity code lock according to the invention.
Fig. 8 is a schematic diagram illustrating the basic circuitry of a storage system according to the invention.

Relay coders incorporating selector switches actuated by stepping relays which seek to match the coding voltages fed to them by the sending unit are readily assembled from available parts. Such a stepping motor and coder for one 3-tone data-code sub-group is shown in Fig. 6. For the 5-tone safety code for 10 safety messages, the coder will be driven by a similar stepping motor but will have 10 positions and will use two stepper-actuating relays, one for each code lead from the sender. The same general plan can be extended further for the 7-tone, 28-valued code group for the general-purpose messages. Fig. 6 is representative directly of one-half of each of the first four relay coders 251—256 of Fig. 2. The combining resistors for unused sub-carriers are shown grounded to maintain constant loading of the sub-carrier buses.

Like the radio transmitter, the private-line radio receiver and its detector may be of entirely conventional form for the carrier channel and type of modulation chosen. Referring to Fig. 3, the output of receiver 300 feeds a bank of 24 subcarrier separating filters 301, 324, tuned to the same frequencies as the sub-carrier generators 201—224, of the transmitter, which filters may advantageously be rough crystal filters. The filters energize 24 sub-carrier buses 331—344 with all signals received, but in general nothing further happens. Only when the particular sub-carrier tone combination corresponding to the particular receiver identity appears does further action take place, and this may be followed from the block diagram of an airborne private-line receiver according to the invention shown in Fig. 3. When the correct identity code is received, and only then, the "identity code lock" 348 produces an output pulse, and this pulse initiates the operation of sequence timer 360. Sequence timers using electronic techniques are now well known, and the one required for this use demands no special properties; upon being pulsed it must immediately key the associated transmitter 192 by means of keyers 188, 189 for a 1-millisecond identity code transmission and must thereafter immediately key a 1-millisecond message transmission; in receiver 300, after a suitable delay to permit decay of the identity output from the filters 301—324, and partial buildup of the immediately following message output, the sequence generator 360 must provide an enabling pulse of about 1 millisecond to activate the "latches" 361—374. The latches 361—374 (only four of the 24 being shown) store the message code thus picked up off subcarrier buses 331—344 as long as needed, and are cleared when no longer needed.

The identity code lock 348 comprises 14 coincidence circuits and 10 anti-coincidence circuits, such that absence of any one tone signal that should be present, or presence of any one tone that should be absent, will positively block an output tube. Only when just the right tones are present and just the right ones absent from the multitone identity pulse will the output tube be unblocked, indicating a call for the aircraft assigned that particular lock combination, and initiating action of the sequence timer. Fig. 7 shows one coincidence unit 701 and one anti-coincidence unit 703, as well as the output tube 710; the other tone-sensing units are like one or the other of those shown.

One latching storage element (361—374) is required for each filter bus, and is preferably arranged as shown in Fig. 8. Sub-carrier voltage from any one bus, for example, 332, is applied to a grid-controlled rectifier 810 actuating the corresponding latching circuit. All such rectifiers are normally cut off by bias applied to their grids, and become active only when receipt of the proper identity code has started sequence timer 360 and the timer has applied a positive enabling pulse to rectifier grid 812. Each rectifier output is coupled to a D.-C. multivibrator 820, or flip-flop, and triggers its multivibrator with a negative rectifier-output pulse if the corresponding sub-carrier is present when the enabling pulse arrives. When so triggered, tube 824 having the relay coil of relay decoder 381s in its anode circuit becomes conducting and so remains until such time as a negative reset pulse is applied to the grid of tube 824. Thus, the relays corresponding to those sub-carrier tones present in the transmitted information code are actuated and those corresponding to tones not present remain idle, storing the received code as long as needed. When the data so stored has been recorded by the indicator, the latter produces a reset pulse which clears all latching elements 361—374.

Figure 9:
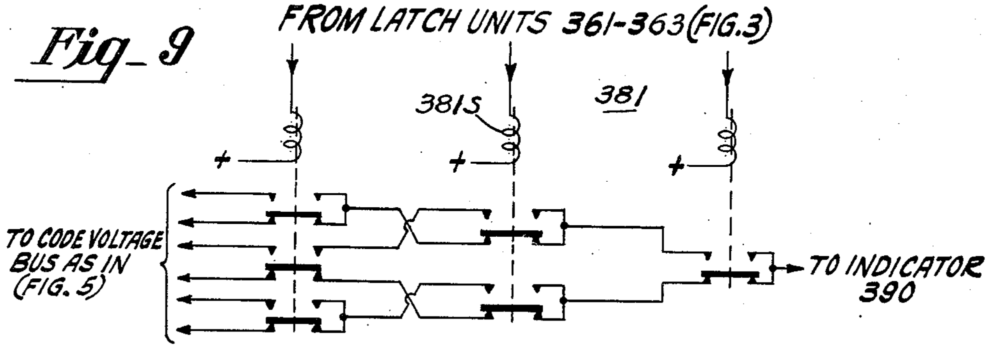
Figs. 9 and 10 are schematic diagrams of suggested connections of a decoding relay according to the invention.
Figure 10:
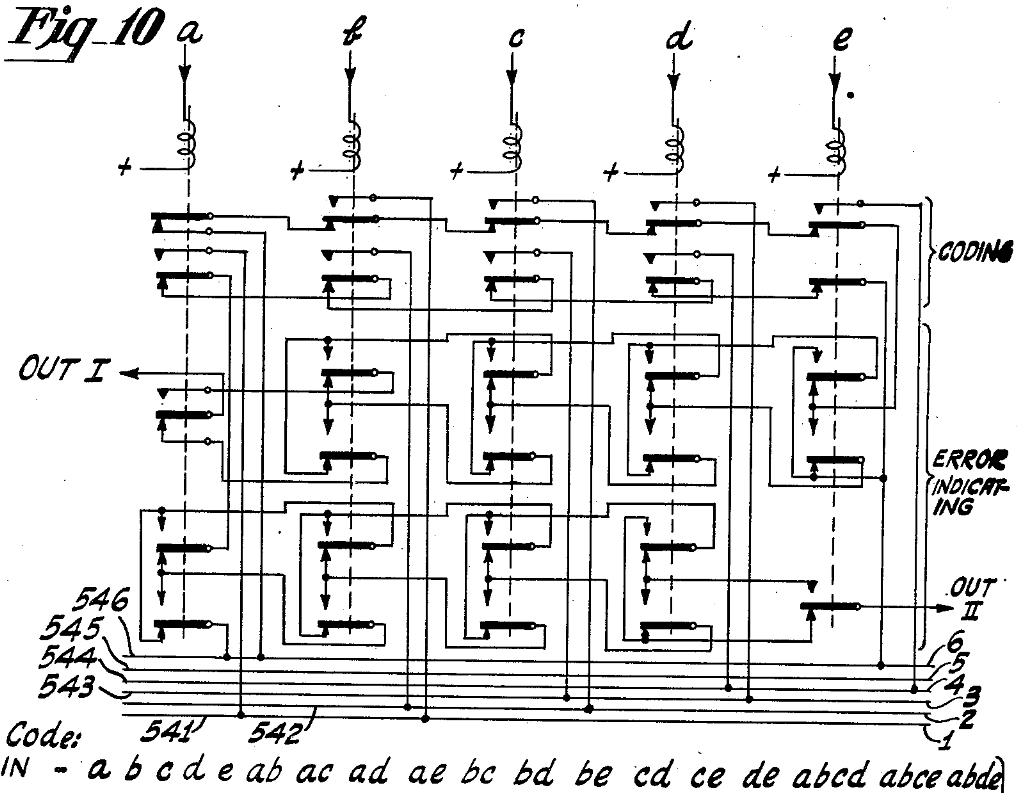

The contacts of the storage relays, grouped according to the subgroups of the data code, form decoders, or more accurately, recoders, which translate the received data to the proper form for actuating the indicator elements. As in the transmitter, an intermediate code using one six-valued element may be used to carry the information received on three sub-carriers, used one or two at a time. Fig. 9 shows the circuit of a relay decoder accomplishing this result, while Fig. 10 shows the more complex connections for a safety-message decoder, using input from five channels worked two at a time in a safety code. There are eleven positions for the two-channel output of Fig. 10, ten message selections and one "no message" or "error" indication. Actuation of zero, one, three or five of the input channels gives the no-message output, but the added complication necessary to indicate an error when four channels are actuated is omitted from the figure. The safety-code property of preventing an undetected error unless two input-code elements are simultaneously falsified remains, even with this omission. The same general type of circuit can be extended by one skilled in the art to give two-channel, 28-position output from the seven-channel input used for the general purpose messages: this is merely elaboration of detail and is not illustrated. Stepping-relay decoders are, of course, an alternative possibility.

The flexibility possible in the organization of the indicator unit is so great that the descriptions which follow are merely illustrative in a rather narrow sense. The indicator may be designed around stepping motors of the sort already suggested to actuate coders for the transmitter which will position themselves to match code voltages on the actuating leads from the relay decoders, as shown on the right-hand side of Fig. 6. These motors may in turn actuate selector switches, indicating disks or drums, or both, as indicated in block form in Fig. 11. Separate motors may be provided for all indicators, or a master motor may be selectably connected to any one indicator by known forms of mechanical or electromagnetic clutches. In any case, each motor will, as also in Fig. 6, include at least one follow-up selector switch. Also a repeat-back selector switch may, if desired, be associated with each indicator element. Since a general-purpose message and a safety message will normally be included in each transmission, relay decoders 385 and 386 of Fig. 3 may be directly and permanently connected to a 10-position and a 28-position indicator unit, respectively, decoding being much simpler, however, if only 26 positions are used. Relay decoders 1 and 2 may together control a 36-position data-class selector, which in turn connects the outputs from decoders 3 and 4 to control the proper one of 36 data indicators. Each such data indicator may be one 36-position unit, two interconnected 6-position units, one 10-position unit and one 3-position unit interconnected, or the like.

Figure 11:
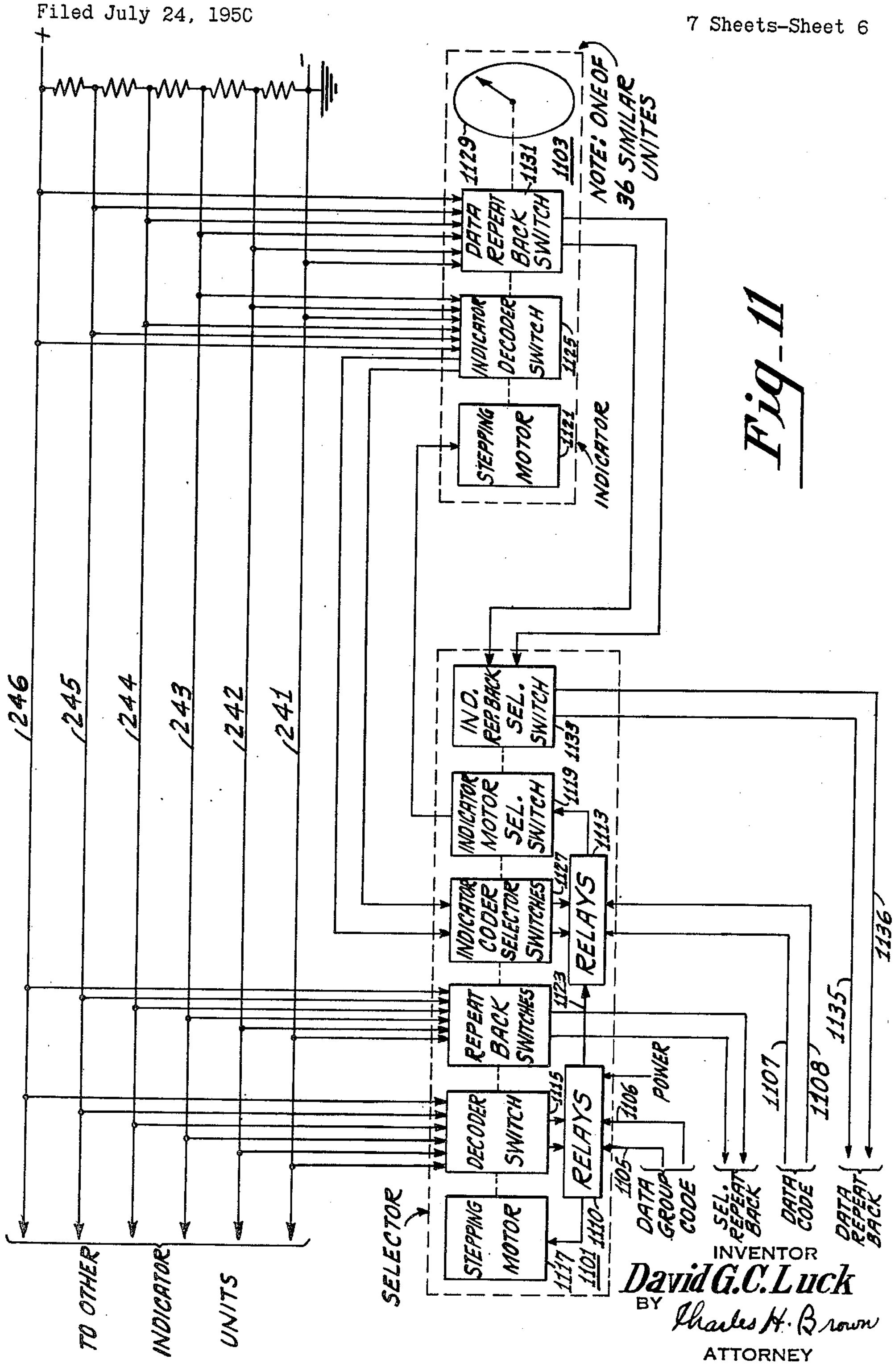
Figs. 11 and 12 are schematic diagrams of examples of indicators useful in the practice of the invention.

Referring specifically to Fig. 11, there is shown a block diagram of a selector arrangement 1101 and one representative indicator 1103 of a group of many similar indicators selectively connected to selector 1101. Intermediate code voltages corresponding to the data group code and data code elements as derived from operation of relay recoders 381—384 of the airborne receiver shown in Fig. 3 are presented on leads 1105, 1106 and 1107, 1108 to banks of one or more servo relays 1110 and 1113 respectively of selector 1101. A decoder switch 1115 applies locally derived voltages, conveniently obtained from buses 241—246, in the various combinations to be decoded to group of relays 1110. Relays 1110 apply power to a stepping motor 1117 to step decoder switch 1115 and other switches mechanically coupled to the motor until the combination of code voltages applied through switch 1115 is identical to those presented at leads 1105 and 1106 whereupon the stepping of the selector unit is terminated with an indicator motor selector switch 1119 selecting indicator 1103 by setting up power connections between servo relays 1113 and stepping motor 1121. Back contacts of servo relays 1110 are arranged to apply power over lead 1123 to servo relays 1113 only upon termination of the selector stepping function so that data displayed on the indicator will not be disturbed as switch 1119 is stepped from one indicator to the next. An indicator decoder switch 1125 functions exactly as switch 1115 to apply the code voltages to relays 1113 required for determination of the data value. In order to isolate the decoder switch circuits of the various indicators the connections from switch 1125 to relays 1113 are made through the intermediary of an indicator coder selector switch 1127 which connects only one indicator unit at a time. Thus stepping motor 1121 steps switch 1125 and some form of indicator, shown here roughly as a dial and pointer assembly 1129, until relays 1113 are opened due to voltage matching whereby the desired data is displayed.

The display of data by indicator unit 1103 is verified by the control station upon receipt of a "repeat back" message originated by a data repeat back switch 1131 coupled to indicator 1129. While the exact same coding may be employed in repeat back messages, it is preferable that a different coding be used to the possibility that compensating errors may occur. Intermediate code voltages are obtained by connections from buses 241—246 and are applied through an indicator repeat back selector switch 1133 of selector unit 1101, corresponding to switch 1127, and leads 1135 and 1136 to relay coders 251—256 of the airborne transmitter shown in Fig. 2, to present the data thereto in the same manner as data from manual sending unit 258 for transmission under control of sequence control generator 360 in response to a request by the control station.

Figure 12:
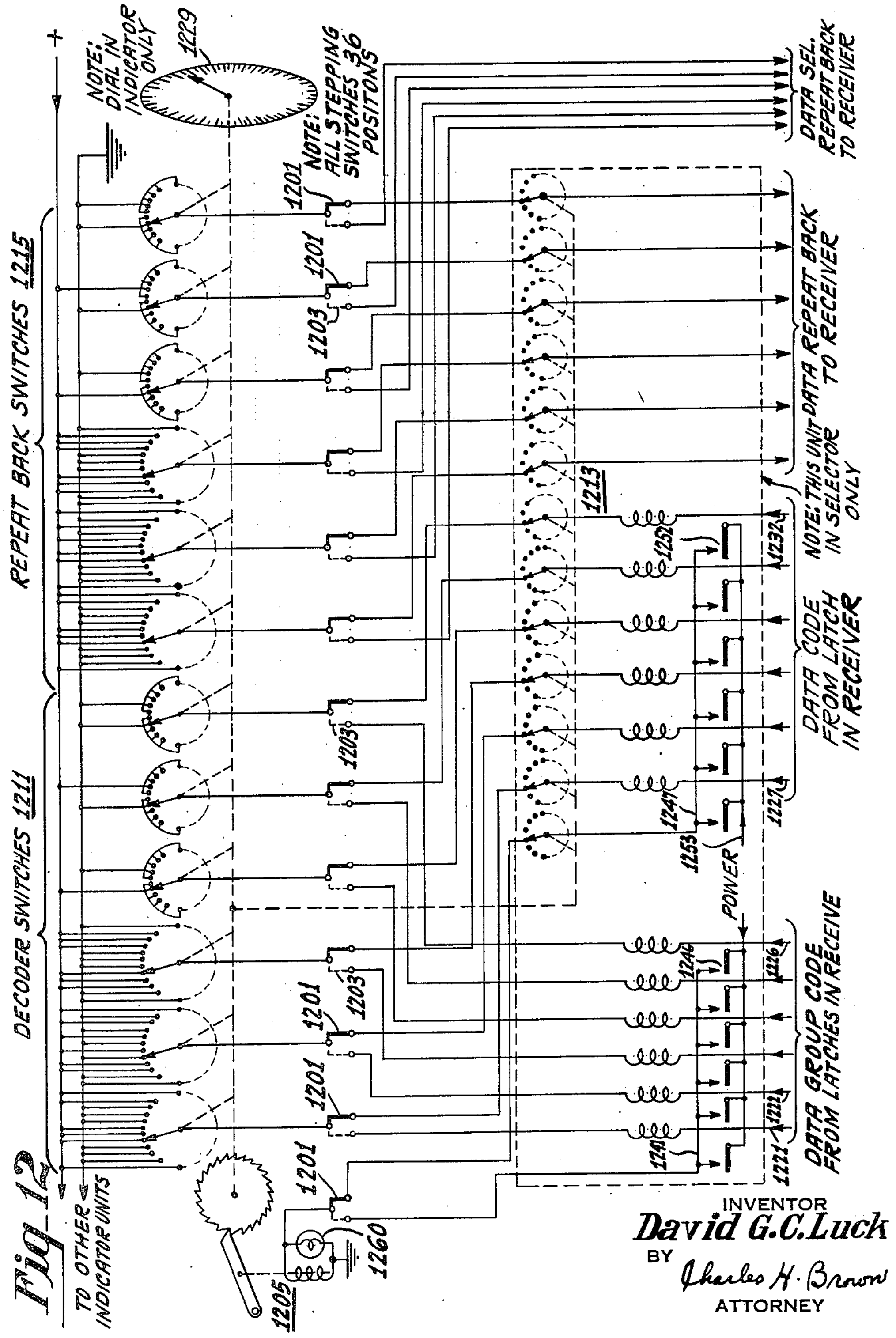

An alternative decoding indicator element from which such an indicator unit may be made up is shown in Fig. 12, with those elements which are present only in the single data-group selector enclosed within the dash lines. Each indicator unit comprises a dial 1229 and those components interconnected by the heavy lines 1201, while broken lines 1203 indicate the interconnections of similar components without dial 1229 or any other visual indicator to form a data-group selector unit, in which form no intermediate code or attendant relay decoders are used; both the selector and the indicator decoding directly from the receiver latches 361—374 shown in Fig. 3. In the individual data-display units, a stepping motor 1205 and follow-up switches 1211 connect to contacts of the data-group selector switches 1213, rather than to relay coils and contacts directly. Mark or space code voltages derived from the latches 361—374 corresponding to data group and data value code are presented by leads 1221—1232 to banks of servo relays 1241—1252. Stepping motor 1205 is actuated in response to closing of the contacts of any one of servo relays 1241—1246 energized by unlike voltages being applied across the coils thereof between leads 1221—1226 and decoder switches 1211, located in the selector; the contacts of which are arranged in various binary voltage code combinations. This selection is made in manner similar to that made in the arrangement shown in Fig. 11. Data code voltages from the latches of the receiver devoted to data values within the selected data-group are presented to further servo relays 1247—1252 by leads 1227—1232. Local code voltages, obtained as before, are derived from indicator decoder switches 1211 located in the indicator and applied to servo relays 1247—1252 through indicator coder selector switches 1213 to step motor 1205 located in the indicator until all of relays 1247—1252 are de-energized by reason of matched applied voltages. Preferably in order to prevent disturbance of the data displayed on other indicator units as selection is being made power to relays 1247—1252 obtained from lead 1253 is applied through back contacts (not shown) of relays 1241—1246 and arranged to close the power circuit only when all of the latter relays are open, that is, after the indicator under consideration has finally been connected to the selector unit. This function, too, is performed in a manner corresponding to that performed in the arrangement of Fig. 11. Repeat back of data in the arrangement of Fig. 12 is accomplished in manner similar to that of the arrangement of Fig. 11 save that the binary voltage coding is not applied in the manner of the output of manual sending unit 258 shown in Fig. 2 but directly in message combining circuit 260 since the binary code is already available and there is then no requirement for translation from any intermediate code. Receiver coding, used on the follow-up switches 1211, need not be the same as the transmitter coding, used on the repeat-back switches 1215, and in the manual sending unit if no intermediate transmitter code is used. In some instances it will be desirable to use a different coding to provide added reliability. As soon as all indicator-actuating stepping servos reach balance, all servo relays 1241—1252 will be open and a negative reset pulse will be returned to all flip-flops 820 shown in Fig. 8 by additional contacts (not shown) on these servo relays, and all data-storing latches 361—374 shown in Fig. 3 will be reset, in readiness to store the next transmission addressed to them. The indicator unit must be fast enough to complete its work and clear the latches between successive transmissions to any one aircraft. Flashing of the attention lights 1260 gives evidence that new data is being received.

Repeat-back switches 1215 can be used to provide automatic closed-circuit checking. When no new transmission is required, these switches are simply connected to the transmitter input. In this case, an automatic sequencing unit, auxiliary to the communication system of this invention and not here described, is needed to establish proper priority of transmission. Priorities should be:

*a.* Completion of information already partially sent. (Hundreds digit of altitude, for example, if thousands already sent.)

*b.* Manual confirmation (if any) of last message received.

*c.* Automatic repeat of last message received.

*d.* New transmission (including manual confirmation of older messages).

*e.* Report data automatically.

The system hereinbefore described in terms of express embodiments appears to have ample capabilities for handling the presently visualized requirements of air traffic control. It is obviously readily adaptable by one skilled in the art to the dispatching and control of other forms of transport without departing from the spirit and scope of the invention.

The invention claimed is:

1. A signalling system for communication between a superior station and a plurality of subordinate stations, including means to generate a plurality of tones, means to combine a number of said tones to form identity tone combinations and to combine a different number of said tones to form intelligence tone combinations, means to assemble said identity tone and intelligence tone combinations into composite tone combinations, further means to assemble said composite tone combinations in sequence for communication with said subordinate stations, means to generate a carrier wave, means to apply said assembled tone combinations to said carrier wave generating means to modulate said carrier wave, means to transmit said modulated carrier wave to said subordinate stations, means at each of said subordinate stations to demodulate said transmitted carrier wave to derive said tone combinations, means coupled to said demodulating means to produce electric current conditions corresponding to said intelligence tone combinations for a time duration beyond that allotted for communication to each station, intelligence display means, means responsive to said established electric current conditions to actuate said intelligence display means, and means coupled to said demodulating means to permit said intelligence display means to be actuated only if the identity tone combination received corresponds to the identity assigned to the subordinate station under consideration.

2. A signalling system for rapid communication between a central station and a plurality of outlying stations with provisions at each station for visually displaying the intelligence transmitted between the central station and each outlying station at a rate necessarily slower than the rate of communication between stations, including at said control station a plurality of tone generators, electrical circuitry coupled to said tone generators and arranged selectively to combine output tones from a number of said tone generators to form a composite tone signal having a component associated with the identity of said outlying stations and a component corresponding to the intelligence capable of being displayed on said visual displaying provisions, and means coupled to said electric circuitry to transmit said signals between stations, transmission from said central station comprising a succession of messages intended for individual outlying stations, and at each of said outlying stations a plurality of tone filters, further electric circuitry coupled to said filters and arranged to establish electric current conditions corresponding to transmitted intelligence signals for a time duration beyond that available for communication to each outlying station, a source of locally generated electric current conditions corresponding to the current conditions of all of said intelligence signals, and means to apply said electric current conditions established by the intelligence component of the transmitted signals and said locally generated electric current conditions to said provisions for visual display of transmitted intelligence, said display provisions having circuitry incorporated therein to energize said display provision when the locally generated electric current conditions differ from the current conditions established by the transmitted intelligence and to indicate the transmitted intelligence when the compared current conditions are identical, said control circuitry also being coupled to said filters and said display provisions, and means to apply said electric current conditions established by the transmitted station identity signal component to said control circuitry to actuate said display provisions only in accordance with the identity of the outlying station under consideration.

3. A signalling system for rapid communication between a control station and a plurality of remote stations with provisions at each station for visually displaying the intelligence transmitted between the control station and each remote station at a rate necessarily slower than the rate of communication between stations, including a plurality of tone generators, electrical circuitry coupled to said tone generators and arranged selectively to combine output tones from a number of said tone generators to form signals associated with the identity of said remote stations and corresponding to the intelligence capable of being displayed on said visual displaying provisions, means coupled to said electric circuitry to transmit said signals between stations, said control station transmitting a succession of single composite tone signal messages each intended for a different remote station, a plurality of tone filters, further electric circuitry coupled to said filters and arranged to establish electric current conditions corresponding to transmitted station identity and intelligence tone signals, a source of locally generated electric current conditions corresponding to each of the current conditions possibly established by the received signals, a comparing and actuating circuit, means to apply said locally generated electric current conditions one at a time to said comparing and actuating circuit, and means to apply said electric current conditions established by the transmitted signals to said comparing and actuating circuit, said provisions for visual display of transmitted intelligence being actuated until the compared current conditions are identical, control circuitry coupled to said filters and said display provisions, and means to apply said electric current conditions established by the transmitted station identity signals to said control circuitry to actuate said display provisions in accordance with the identity of the remote station under consideration, means in the display provisions of said remote stations to regenerate a tone combination corresponding to the data displayed in response to transmission by said control station, means coupled to said regenerating means to transmit said regenerated tone combinations to said control station, means at said control station to compare the original tone combinations with the regenerated tone combinations, and means to transmit a further tone combination constituting a confirmation signal to the remote station originating said regenerated tone combination.

4. A signalling system for rapid communication between a control station and a plurality of remote stations with provisions for visually displaying the intelligence transmitted between the control station and each remote station at a rate necessarily slower than the rate of communication between stations, including a plurality of tone generators, electrical circuitry coupled to said tone generators and arranged selectively to combine output tones from a number of said tone generators to form composite tone signals of tones associated with the identity of said stations and corresponding to the intelligence capable of being displayed on said visual displaying provisions, means coupled to said electric circuitry to transmit said signals between stations, wave reception means at each of said stations, a plurality of tone filters coupled to said wave reception means, a sequence synchronizing generator, an identity locking circuit coupled between said tone filters and said sequence synchronizing generator to actuate the same only in response to received identity tone signals corresponding to the remote station under consideration, a conductor network, an indicator network including a local code voltage bus, an indicator having data group sections and a data value section, each of said sections having at least an individual stepping motor, an individual decoding switch assembly and an individual power applying relay connected to said stepping motor, both of said indicator sections being connected to said bus to apply code voltages to the decoding switch in the code combinations which that section is to decode, a plurality of electric trigger circuits coupled to said filters and under control of said sequence synchronizing generator to apply potentials to said conductor network corresponding to the received message signals for a time duration beyond that required for transmission of said signals, said conductor network being connected to the power applying relay of the indicator section under consideration, said relay applying power to said stepping motor and stepping said decoding switch until the voltage applied to said relay by said switch is equal to that applied by said bus whereby the position of said stepping motor is indicative of the intelligence transmitted, an indicator device coupled to the stepping motor of each of said data value sections, a further switch in each of said data value sections connected to said bus to regenerate a tone combination corresponding to the data displayed, means coupled to said regenerating means to transmit said regenerated tone combinations to said control station, means at said control station to compare the original tone combinations with the regenerated tone combination, and means to transmit a confirmation tone combination to the remote station originating said regenerated tone combinations.

5. A signalling system for communication between a control station and a plurality of remote stations, including a plurality of tone generators, identity combining circuits coupled to said tone generators, message combining circuits coupled to said tone generators, connections arranged to connect said combining circuits selectively to a number of said tone generators to produce a composite tone signal, a means of wave transmission and a sequence control circuit arranged to make said connections in proper sequence to transmit a train of composite tone signals comprising remote station identity and message text components to a number of said remote stations, a means of wave reception at each of said remote stations, a plurality of tone filters coupled to said wave reception means, a sequence synchronizing generator, an identity locking circuit coupled between said tone filters and said sequence synchronizing generator to actuate the same in response to the identity component of a received signal corresponding to the remote station under consideration, a conductor network, an indicator network including a local code voltage bus, an indicator having data group and data value sections, each of said sections having at least an individual stepping motor, an individual decoding switch assembly and an individual power applying relay connected to said stepping motor, both of said indicator sections being connected to said bus to apply code voltages to the decoding switch in the code combinations which that section is to decode, a plurality of electric latch circuits coupled to said filters and under control of said sequence synchronizing generator to connect potentials to said conductor network corresponding to the received message text components for a time duration greater than that required for transmission of said composite tone signal, said conductor network being connected to the power applying relay of the indicator section under consideration, said relay applying power to said stepping motor and stepping said decoding switch until the voltage applied to said relay by said switch is equal to that applied by said bus whereby the position of said stepping motor is indicative of the intelligence transmitted, and an indicator device coupled to the stepping motor of each of said data value sections.

6. A signalling system for rapid communication between a superior station and at least one of a possible plurality of subordinate stations with provisions at each station for visually displaying the intelligence at a rate necessarily slower than the rate of communication between stations, including at said superior station a plurality of tone generators, electrical circuitry coupled to said tone generator and arranged selectively to combine output tones from a number of said generators to form a single composite tone signal for transmission to each of said subordinate stations with which communication is desired, each such composite tone signal including station identity components as well as prearranged intelligence components, and means to transmit said single composite tone signals to said subordinate stations in time sequence, and at said subordinate stations a plurality of tone filters, means individually coupled to said tone filters to store the intelligence component of the transmitted signals for a time duration beyond that allotted for transmission to each of said subordinate stations, means coupled to a number of said tone filters corresponding to the identity of the subordinate station only to activate said storage means, actuating means for said visual display provisions, means to establish a plurality of sets of local signal conditions corresponding to the intelligence capable of being displayed, means coupled to said actuating means for comparing said local signal conditions one at a time with said stored signal conditions to actuate said display provisions until the compared conditions are identical.

7. A signalling system for rapid communication between a superior station and a plurality of subordinate stations with provisions at each station for visually displaying the intelligence at a rate necessarily slower than the rate of communication between stations, including at said control station a plurality of tone generators, electrical circuitry coupled to said tone generators and arranged selectively to combine output tone from a number of said generators to form a single composite tone signal for transmission to each of said subordinate stations with which communication is desired, each such composite tone signal including station identity components as well as prearranged intelligence components, means to transmit a carrier wave, and means to modulate said carrier wave by said single composite tone signals to said subordinate stations in time sequence, and at said subordinate stations means to receive said carrier wave, a plurality of tone filters coupled to said receiving means, means individually coupled to said tone filters to produce electric current conditions corresponding to the intelligence component of the transmitted signals for a time duration beyond that allotted for transmission to each of said subordinate stations, means coupled to a number of said tone filters corresponding to the identity of the subordinate station only to activate said electric current producing means, actuating means for said visual display provisions, means to establish a plurality of sets of local electric conditions corresponding to the intelligence capable of being displayed, means coupled to said actuating means for comparing said locally generated electric conditions one at a time with said electric conditions corresponding to the received signal to actuate said display provisions until the compared conditions are identical.

8. A signalling system for rapid communication between a superior station and a plurality of subordinate stations with provisions at each station for visually displaying the intelligence at a rate necessarily slower than the rate of communication between stations, including at said control station a plurality of tone generators, electrical circuitry coupled to said tone generators and arranged selectively to combine output from a number of said generators to form a single composite tone signal for transmission to each of said subordinate stations with which communication is desired, each such composite tone signal including station identity components as well as prearranged intelligence components, and means to transmit said single composite tone signals to said subordinate stations in time sequence, and at said subordinate stations a plurality of tone filters, a conductor network, a source of voltages of different values, switching means individually coupled to said tone filters to connect voltages from said source corresponding to the intelligence component of the transmitted signals to said conductor network for a time duration beyond that allotted for transmission to each of said subordinate stations, means coupled to a number of said tone filters corresponding to the identity of the subordinate station only to activate said switching means, actuating means for said visual display provisions connected to said conductor network, means to connect a plurality of sets of voltage values corresponding to the intelligence capable of being displayed to said actuating means one at a time to actuate said display provisions until the voltages applied to said actuating means are equal in value.

9. A communication system for transmitting individual messages in rapid sequence to a plurality of receiving stations for display thereat by visual indicators ineffective to display said messages in the time allotted for transmission thereof, including a carrier wave generator, a plurality of sub-carrier frequency generators, a number of selection circuits, a sequence control generator arranged to connect said selection circuits to said sub-carrier generators to produce a carrier wave modulated in time sequence by a number of sub-carrier frequencies comprising frequency combinations exclusively assigned to identity code and frequency combinations assigned to predetermined intelligence characters, means to receive said modulated carrier wave at each of said stations, means to demodulate said carrier wave to derive the transmitted sub-carrier frequencies, actuating means coupled to the visual indicators of each receiving station, means responsive only to said frequencies assigned to the identity code of the receiving station under consideration to render said actuating means effective to operate said visual indicator, said actuating means comprising a conductor network, a source of voltage of discretely varying values, a plurality of switching arrangements individually coupled to said demodulating means to connect values of said voltage corresponding to the received intelligence character to said conductor network for a time greater than the time allotted for transmission of the modulated carrier wave to each receiving station, an indicator operation device connected to said network, further switching arrangements sequentially connecting voltage values corresponding to the intelligence characters of which said indicators are capable of displaying to said indicator operating device to operate the same until the voltage applied thereto is of equal value.

10. A signalling system for rapid communication between a plurality of stations with provisions at each station for visually displaying the intelligence transmitted between the stations at a rate necessarily slower than the rate of communication between said stations, including a plurality of tone generators, electric circuitry coupled to said tone generators and arranged selectively to combine output tones from a number of said tone generators to form signals associated with the identity of said stations and signals corresponding to the intelligence capable of being displayed on said visual displaying provisions, means coupled to said electric circuitry to transmit said signals to other stations, means to receive signals transmitted from another of said stations, a plurality of tone filters coupled to said signal receiving means, other electric circuitry coupled to said filters and arranged to establish electric current conditions corresponding to the intelligence signals, further electric circuitry coupled to said tone filters and arranged to activate said other electric circuitry only in response to an identity signal corresponding to that assigned to the station intended to display generated electric currents corresponding to the signals associated with the signals corresponding to the intelligence capable of being displayed, and means to compare said electric current conditions established by the transmitted signals with said locally generated electric currents one set at a time for visual display of the transmitted intelligence when the compared current conditions are identical.

11. A signalling system for two-way communication between a controlling station and a plurality of controlled stations with provisions at each station for visually displaying the intelligence transmitted between stations at a rate necessarily slower than the rate of communication between stations, including at said controlling station means to generate a plurality of tones, means to combine different ones of said tones to form identity signals associated individually with said controlled stations, means to transmit said identity signals consecutively and cyclically, and at said controlled stations means to receive the transmitted signals, a plurality of tone filters coupled to said receiving means, means to transmit signals in response to messages received from said controlling station, means to control said transmitting means, means coupled to said tone filters to activate said transmitting controlling means only in response to a predetermined identity signal, whereby the controlled stations are afforded ample opportunity to transmit messages to said controlling station without interfering with any other of said stations.

12. A signalling system for rapid communication between a plurality of stations with provisions at each station for utilizing the intelligence transmitted between the stations at a rate necessarily slower than the rate of communication between said stations, including a given number of tone generators, electric circuitry coupled to said tone generators and arranged selectively to combine output tones from a predetermined number less than said given number of said tone generators to form signals associated with the identity of said stations and means to combine any number of said tones to form signals corresponding to the intelligence desired to be transmitted, means coupled to said electric circuitry to transmit said signals to other stations, means to receive signals transmitted from another of said stations, a plurality of tone filters coupled to said signal receiving means, other electric circuitry coupled to said filters and arranged to establish electric current conditions corresponding to the intelligence signals, further electric circuitry coupled to said tone filters and arranged to activate said other electric circuitry only in response to an identity signal corresponding to that assigned to the station intended to utilize said intelligence, said further electric circuitry comprising a number equal to said given number of circuits individually tuned to the frequencies of said tone generators, a number equal to said predetermined number of said circuits being arranged to produce currents of predetermined nature in response to application of said tones forming said identity signals and the remainder of said circuits being arranged to produce currents of nature opposite to said predetermined nature, and a controlling circuit connected in common to said tuned circuits and to said other circuitry and responsive to currents of said predetermined nature only whereby said station is activated only upon receipt of the identity signal associated therewith.

13. A receiving circuit for a two-way communication system between a plurality of stations with provisions at each station for visually displaying the intelligence transmitted between stations at a rate necessarily slower than the rate of communication between stations, including at each receiving station means to receive the signals transmitted between said stations, a plurality of tone filters coupled to said receiving means, means to decode signals bearing messages from another station, a sequence timing wave generator to control said decoding means, a detector coupled to said tone filters to activate said decoding means only in response to an identity signal assigned to the receiving station under consideration, said detector comprising a controlled electron path device having output electrodes arranged to energize said sequence timing wave generator and a control electrode normally biased to prevent conduction, a plurality of circuits tuned to frequencies present in said identity signal and coupled to said control electrode, to condition said device for conduction in response to application of said frequencies to other frequencies to prevent conduction in response to application of any frequency other than those present in said identity signal, whereby decoding is accomplished without any additional synchronizing signals.

References Cited in the file of this patent

UNITED STATES PATENTS

| Number | Name | Date |
|---|---|---|
| 1,786,805 | Wensley | Dec. 30, 1930 |
| 2,181,682 | Scheidegger | Nov. 28, 1939 |
| 2,248,822 | Quinby | July 8, 1941 |
| 2,392,355 | Anderson et al. | Jan. 8, 1946 |
| 2,440,118 | Reinhold et al. | Apr. 20, 1948 |
| 2,477,973 | Evers | Aug. 2, 1949 |
| 2,497,936 | Finch | Feb. 21, 1950 |